Aug. 3, 1954
N. L. DICKINSON
2,685,498
METHOD FOR CONTROLLING THERMAL CONDITIONS
IN A GASEOUS REACTION
Filed Dec. 30, 1948
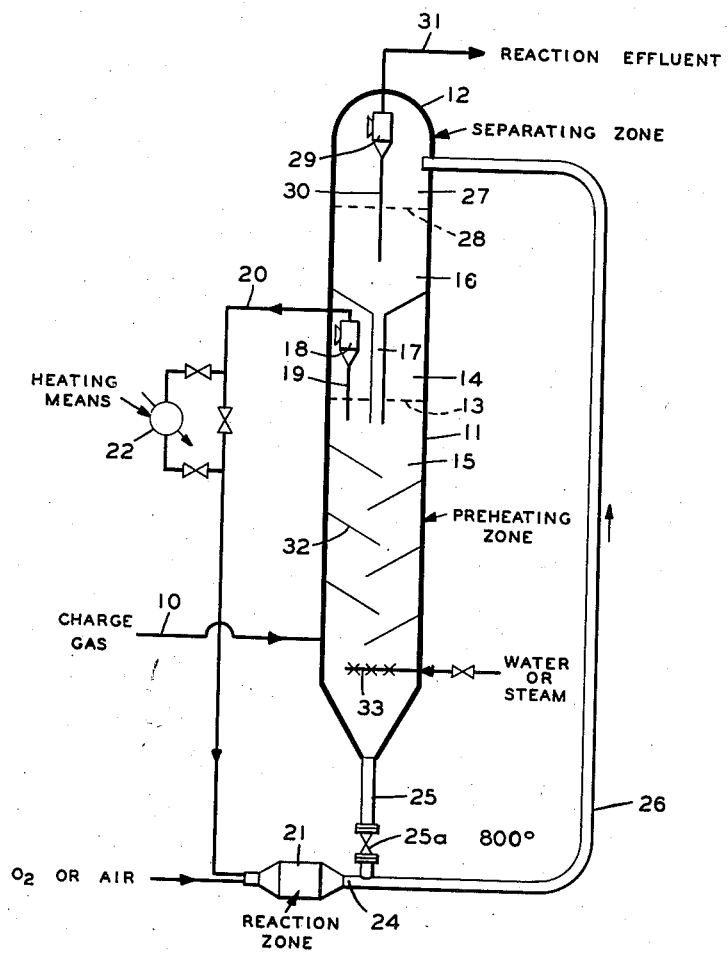
INVENTOR.
NORMAN L. DICKINSON
BY E. F. Liebrecht
Edmond F. Shanahan
ATTORNEYS Patented Aug. 3, 1954

2,685,498

UNITED STATES PATENT OFFICE 2,685,498

METHOD FOR CONTROLLING THERMAL CONDITIONS IN A GASEOUS REACTION

Norman L. Dickinson, Basking Ridge, N. J., assignor to The M. W. Kellogg Company, Jersey City, N. J., a corporation of Delaware Application December 30, 1948, Serial No. 68,139

1 Claim. (Cl. 23—1)

This invention relates in general to a method for controlling the thermal conditions of a gaseous reaction and, more particularly, to a method in which a charge gas to a gaseous reaction is preheated by countercurrent contact with finely divided inert solids and the cool solids are introduced into the hot gaseous effluent from the reaction to cool the effluent and reheat the solids. The method is particularly adapted to the pyrolysis of light hydrocarbons to obtain such products as diolefins, light olefins, acetylene, and aromatics.

In many gaseous reactions it is desirable to preheat the charge to the reaction by heat exchange with the reaction effluent. This heat exchange has frequently been accomplished by means of an inlet-outlet heat exchanger in which the heat of reaction effluent was transferred to the charge gases. The heat losses common to all indirect heat-exchange systems are experienced. It is not possible to effect the cooling of the reaction effluent suddenly by this method and it is, therefore, not suitable for reactions which require sudden quenching to a temperature substantially below reaction temperature in order to prevent reaction from going farther than is desired. If the reaction is carried out at high temperature, corrosion of the heat exchanger presents a problem, and with many gaseous reactants, the fine passages of the heat exchanger tend to be fouled and clogged by deposits of carbon or other residues. In preheating the charge gas for certain reactions, it is necessary to guard against exceeding a certain preheating temperature; if the heat exchanger of all surfaces is at the maximum preheat temperature, then gases a short distance from the wall surface are at a somewhat lower temperature and the charge gas can be heated to the maximum preheat temperature without exceeding that temperature at the wall surfaces. The present invention proposes to avoid all these disadvantages by employing a circulating steam of finely divided inert solids as a heat carrier.

The invention is not limited to those reactions in which it is necessary to suddenly quench the reaction effluent, but it is most likely to find its application in such reactions, since more conventional inlet-outlet heat exchangers will ordinarily be satisfactory if sudden quenching is not required. Quenching the reaction effluent by the introduction of cooled solids has been previously employed in the art of controlling the thermal conditions of gaseous reactions. The novelty of the present invention, however, resides in the combination of this type of quenching (or cooling) with a recovery of heat from the quenching solids by countercurrently contacting the solids with reaction charge gas in order to preheat the charge gas. In the preferred form of the invention, the reaction effluent is used not only to heat the finely divided solids but to transport them to a separating zone at a higher elevation than the preheating zone so that hot solids may be continuously fed into the upper portion of the preheating zone. In another species of the invention a dense fluidized bed is employed in the preheating zone. The dense fluidized mass resembles that employed in fluidized cracking systems, except that the mass is downwardly moving and that various means are employed to prevent the upward circulation of hot particles; this latter difference is necessary in order to establish a temperature gradient within the downwardly moving fluidized mass, with a temperature in the lower portion of the mass substantially lower than the temperature in the upper portion.

The method of the invention may be best understood by reference to the accompanying drawing in which an apparatus suitable for the practice of the invention is diagrammatically illustrated. A charge gas comprised of one or more gases used in the reaction is introduced through line 10 into the lower portion of the vertically extended tower 11, the interior of which provides a preheating zone in which upflowing charge gas is preheated by countercurrent contact with a downflowing stream of powdered solid. Hot powder is supplied to the upper portion of preheating zone 11 from a separating zone 12 which, in the present embodiment surmounts the preheating zone. Preferably, the hot powder introduced into preheating zone 11 forms a dense fluidized bed therein separated by an upper surface region 13 from a dilute upper phase 14. The fluidized mass 15 in preheating zone 11 is supplied from a similar dense fluidized mass 16 in separating zone 12 by means of a standpipe 17 which discharges hot powder into the mass 15 at some point not far beneath the interface 13. Charge gas rising through the fluidized mass 15 escapes from the interface 13 and passes through a separator 18, which is located in the dilute phase 14 and is employed to separate entrained particles and return them through dip pipe 19 to the fluidized mass 15. Heated charge gas is withdrawn from the separator 18 through line 20 and transferred to reaction zone 21. Ordinarily, it will be necessary to supply additional heat to the charge gas by diverting all or a part of it through a heating means 22 as it is transferred to the reaction zone 21. In this example, it is assumed that combustion occurs in the reaction zone and an inlet 23 for introducing oxygen or air is, therefore, shown. However, the invention is not limited to reactions in which additional reactant is introduced at this point. The gases reach their maximum temperature within reaction zone 21. Hot effluent leaves the zone at outlet 24 and is suddenly quenched when it encounters a side stream of relatively cool powder being continuously introduced into the effluent from standpipe 25, which is supplied from the bottom of preheating zone 11. The mixture of quenched effluent and heated powder move through a transfer line 26 to separating zone 12. Preferably, separating zone 12 contains an accumulation of hot powder in a dense fluidized mass 16 separated from an upper dilute phase 27 by an interface region 28. In such an arrangement the effluent, with its entrained powder is introduced into the upper dilute phase 27. Since the velocity of the gases emerging from transfer line 26 is greatly reduced as these gases enter the relatively large space in separating zone 12, most of the powder falls at once to dense phase 16. The effluent is continuously withdrawn through a separator 29 in which remaining powder is separated and deposited in fluidized mass 16 through tail pipe 30. The reaction effluent, substantially powder-free, is withdrawn through line 31.

In preheating zone 11 the downflowing stream of fluidized powder continuously loses heat to the charge gas passing upwardly through it. Under satisfactory conditions the temperature of the downflowing fluidized powder will diminish with elevation so that the temperature within the fluidized mass and the region of the charge gas inlet are substantially lower than those in the upper portion of the fluidized bed 15 near the outlet of tail pipe 17. In the ordinary fluidized bed, the liquid-like character of the fluidized mass tends to establish a uniform temperature throughout the mass. Such a condition is undesirable in the present application and various measures must be taken to preserve a vertical temperature gradient within the fluidized mass 15. One of the simplest and most practical means for doing this is to provide insulating baffles 32 which, in effect, separate fluidized bed 15 into a series of separate fluidized beds, one above the other. Free circulation throughout the bed is thus prevented and the combined effect of the baffling and the continuous downward flow of particles make it possible to preserve a substantial temperature gradient. It should be noted that the present invention is not limited to a system in which liquid-like fluidized masses are employed. The fluidized system is preferred but the method of the invention might also be employed if the heat carrying solids merely slide down the preheating zone under the influence of gravity without the internal circulation and liquid flow characteristics of a fluidized mass.

When it comes to engineering a system for the present method, it will be found, in some cases, that quenching requirements make it necessary to provide more cooling for the powdered solids than merely countercurrently cooling them with a charge gas. A cooling means 33 may be provided near the bottom of the preheating zone 11, at an elevation somewhat lower than the charge gas inlet 10, so that the downflowing solids may be further cooled after countercurrent contact with the charge gas and before being employed for quenching. In a reaction involving steam, such as the pyrolysis reaction described herein for illustrative purposes, this cooling may be very satisfactorily accomplished by introducing water through cooling means 33; the introduced water is promptly volatilized, thereby supplying the system with needed steam and cooling the downflowing solids.

The method and apparatus described may be employed in the pyrolysis of light hydrocarbons. The charge gases composed of a mixture of steam with one or more of the following; ethane, propane, mixed light hydrocarbons, naphtha, gas-oil, etc. A substantial part of the steam may be derived from water introduced at 33. The mixture of steam and charge gas rises through the preheating zone and encounters particles ranging from temperatures of about 600° F. in the vicinity of the charge gas inlet 10 to about 800° F. in the region of the interface 13. The charge gas is preheated by countercurrent contact to approximately 800° F. in the preheating zone 11 and is then withdrawn through line 20 to be further preheated by preheating means 22 to a temperature of about 1600° F. In the reaction zone 21 the preheated charge gas encounters oxygen and combustion occurs for a very brief interval of time. In this brief interval substantial percentages of the charge gas are converted into olefins, diolefins, acetylene, or aromatics, depending upon the charge gas composition and reaction conditions. It is necessary that the reaction effluent be suddenly quenched to about 800° F. in order to prevent degeneration of the desired products. Downflowing solids from the preheating zone 11 are cooled to a temperature of about 450° F. by heat exchange with the charge gas and with the water introduced at 33. A steady stream of the relatively cool powder emerges from standpipe 25 into the effluent at reaction zone outlet 24 to effect the quenching. By controlling the amount of heat supplied by heating means 22 and cooling effected by cooling means 33, and also by regulating the flow of solids by means of valve 25a, thermal conditions can be so controlled that the reaction effluent is quickly cooled to the desired quenching temperature of 800° F. and the powder is reheated to approximately the quenching temperature. In separating means 12 hot powder is separated from the quenched effluent and is used to replenish the downflowing catalyst mass 15 in preheating zone 11. Thet temperatures given are merely exemplary of the thermal conditions which are likely to be encountered in a typical application of the invention. If a higher quenching temperature is permissible considerably more of the preheating can be accomplished by means of the circulating powder.

The invention is not limited to pyrolysis reactions nor to reactions in which sudden quenching is required. The method of the invention may also be used in reactions which require the use of powdered catalyst. It is only necessary that the catalyst powdered be much more finely divided than the inert solids. The velocity of the charge gas upwardly through preheating zone 11 may then be regulated so that a sufficient quantity of the fine grained catalyst is entrained in the charge gas and carried with it through separator 18, line 20, heating means 22 to the reaction zone 12. The inert solids, being much coarser than the catalyst, will tend not to circulate with the catalyst and charge gas through the reaction zone; of course, some relatively small proportion of inerts will circulate through the reaction zone, but the difference in particle size between catalyst and inerts will be relied upon to substantially limit this. Undoubtedly, the charge gas will fail to strip all of the catalyst fines from the downwardly moving mass 15; but, if sufficient catalyst is carried overhead through separator 18 and line 20, it is immaterial that substantial quantities of catalyst are not so entrained and move with the inerts into the standpipe 25. At reaction outlet 24 the catalyst used in the reaction rejoins a stream of inerts and both catalyst and inerts are separated in separating zone 12 to be returned to the upper portion of preheating mass 15 through standpipe 17.

I claim:

A method for controlling thermal conditions in a gaseous reaction, which includes the steps of: continuously introducing a charge gas for said reaction upwardly through a mass of finely divided solids in a vertically extended preheating zone; continuously introducing a cooling fluid upwardly through said mass from a point below the introduction of said charge gas and at a rate sufficient to maintain said mass of solids in a state of separation into an upper dilute phase and a lower dense liquid-like phase; maintaining the lower end of said dense phase mass at a temperature sufficiently low to quench said gaseous reaction; continuously introducing hot solid particles into the upper end of said dense phase mass to maintain temperatures in said upper end sufficiently high to initiate said gaseous reaction; baffling the flow of solids in said dense phase so that they are constrained to flow from the upper end to the lower end thereof, whereby said lower end is maintained at a temperature sufficiently low to quench said gaseous reaction and said upper end is maintained at temperatures sufficiently high to initiate said gaseous reaction heating said charge gas to reaction temperature by upward passage through said heating zone dense phase and withdrawing heated charge gas from said heating zone dilute phase and reacting said heated charge gas in a reaction zone; maintaining a vertically descending column of dense phase solid particles at quenching temperature flowing vertically downwards from said dense phase mass into contact with reaction effluent from said gaseous reaction to quench said effluent and reheat said solid particles in a dilute mixture of particles entrained in a stream of gaseous effluent; discharging said entrained mixture into an enlarged separating zone located above said heating zone and collecting settled particles in a mass in the lower portion of said separating zone; withdrawing effluent from the upper portion of said separating zone; maintaining a column of down flowing solids descending from the lower part of said separating zone into said heating zone dense phase.

References Cited in the file of this patent

UNITED STATES PATENTS

| Number | Name | Date |
|---|---|---|
| 2,393,636 | Johnson | Jan. 29, 1946 |
| 2,422,791 | Leffer | June 24, 1947 |
| 2,443,210 | Upham | June 15, 1948 |
| 2,448,922 | Simpson | Sept. 7, 1948 |
| 2,458,960 | Roetheli | Jan. 11, 1949 |
| 2,493,911 | Brandt | Jan. 10, 1950 |